Jan. 6, 1942.  L. F. HEMPHILL  2,269,154
DYNAMOELECTRIC MACHINE
Filed Nov. 7, 1939
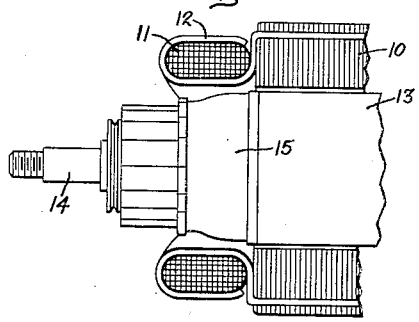
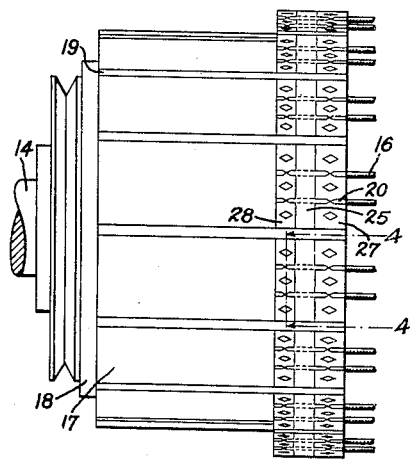
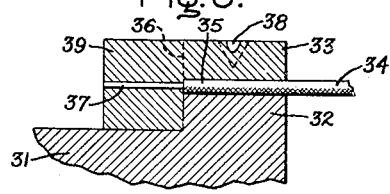
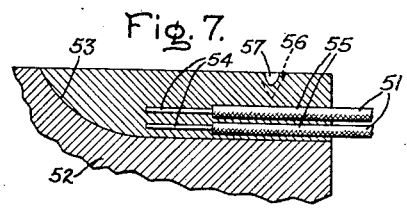
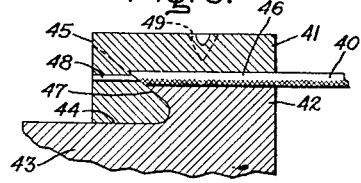
Inventor:
Lawrence F. Hemphill,
by Harry E. Dunham
His Attorney.

Patented Jan. 6, 1942

2,269,154

UNITED STATES PATENT OFFICE 2,269,154

DYNAMOELECTRIC MACHINE

Lawrence F. Hemphill, Fort Wayne, Ind., assignor to General Electric Company, a corporation of New York Application November 7, 1939, Serial No. 303,243

12 Claims. (Cl. 171—321)

My invention relates to a dynamo-electric machine, and particularly to an arrangement for connecting the winding of a rotatable member thereof to a commutator.

Dynamo-electric machine rotatable members often are provided with a winding formed of conductors connected to a current collecting device such as a commutator. These conductors usually are secured to the commutator by a suitable solder, and this solder provides a good electrical connection between these two elements, but tends to penetrate into the conductor. In small machines, difficulty has been encountered by this penetration of the solder into the conductor beyond the ends of the commutator, as it embrittles and stiffens the conductor adjacent its connection to the commutator. The solder not only penetrates and embrittles the conductors, but carries part of the copper into solution and materially reduces the size of this part of the leads. Under vibration and high operating speeds, this embrittled and smaller portion of the conductor tends to break and open-circuit certain parts of the armature, thereby impairing the operation of the machine. Furthermore, lead cleaning methods normally employed, such as sanding or wire brushing methods, damage the leads back of the commutator.

An object of my invention is to provide an improved connection between a conductor and another electrically conductive element.

Another object of my invention is to provide an improved current collecting device having a connection to a conductor.

A further object of my invention is to provide an improved dynamo-electric machine having a rotatable member provided with a winding formed of conductors connected to a current collecting device.

A still further object of my invention is to provide an improved method of making the above devices.

Further objects and advantages of my invention will become apparent and my invention will be better understood from the following description referring to the accompanying drawing, and the features of novelty which characterize my invention will be pointed out with particularity in the claims annexed to and forming a part of this specification.

Referring to the drawing, Fig. 1 is a partial side elevational view, partly in section, of a dynamo-electric machine embodying my invention; Fig. 2 is an enlarged view of the commutator and part of the connected rotatable member winding shown in Fig. 1; Fig. 3 is an enlarged sectional view of a commutator segment taken along line 3—3 of Fig. 4; Fig. 4 is an enlarged sectional view of a part of the commutator elements and leads taken along line 4—4 in Fig. 2; Fig. 5 is a sectional view of a commutator segment and conductor connection thereto illustrating a modification of my invention; Fig. 6 is a sectional view of a part of a commutator segment and conductor connection thereto illustrating another modification of my invention; and Fig. 7 is a sectional view of a part of a commutator segment and conductor connection thereto illustrating a further modification of my invention.

In the drawing, I have shown a dynamo-electric machine provided with a stationary member having a laminated core 10 of magnetic material arranged to be excited by field exciting winding 11 secured thereto and insulated therefrom by an insulating mounting 12. The machine is provided with a rotatable member arranged to react electrodynamically with the stationary member and includes a core 13 of magnetic material supported upon a shaft 14. The rotatable member is provided with a winding 15 formed of insulated conductors 16, which are connected to a commutator also mounted upon the shaft 14. This commutator includes a plurality of commutator segments 17 arranged in circumferentially spaced apart relation about the periphery thereof and insulated from the shaft 14 by an insulating element 18. Insulating segments 19 also are arranged between adjacent commutator segments completely to insulate each segment from other parts of the commutator. In order to provide an electrical connection between the commutator segments 17 and the conductors 16, I form a plurality of longitudinally extending slots or recesses 20 in each commutator segment adapted to receive an end of one of the rotatable member winding conductors 16. As is more clearly shown in Figs. 3 and 4, the insulation is removed by brushing or any other suitable method from about a part 21 of the conductor 16, and this uninsulated portion 21 of the conductor and an adjacent portion 22 of insulated conductor are arranged in a recess 20, with the insulated part 22 of the conductor extending from outside of the commutator into the recess 20. In this arrangement, the insulation 23 is not removed from an end 24 of the conductor 16, and this end also is arranged in the recess 20 of the commutator segment. In order to insure a good electrical contact between the conductor 16 and the commutator segment 17, I provide a circumferentially extending groove 25 formed intermediate the ends of each commutator segment riser 26, thereby separating the outer end of the riser into two sections 27 and 28. The conductor 16 is arranged in the recess 20 with the end 24 in the recess extending through the segment riser portion 28, the part 21 of the conductor without insulation arranged in the groove portion 25 of the recess, and the insulated end 22 in the recess 20 formed in the end 27 of the commutator riser 26. I stake or punch the commutator segment at 29 adjacent the recess 20, so as to press together the sides of the recess 20 at points 30 above the insulated parts 22 and 24 of the conductor 16 to secure the conductor in position in the commutator segment between the sides of the recess as shown in Figs. 2 and 4. When all of the conductor leads from the rotatable member winding 15 have been secured in position in recesses 20 formed in the commutator segments 17, the riser portion 26 of the commutator is submerged in molten metal, which may comprise any suitable soldering material, so that the recesses 20, the grooves 25, and the staking punches 29 are filled with this soldering material. This molten solder is then solidified in these openings and provides a secure electrical connection between the conductor 16 and the commutator conductive elements or segments 17. The electrical connection thus formed insures good contact between the different conductive elements as the solder penetrates into the conductor through the portion 21 from which the insulation 23 has been removed. Furthermore, the conductor 16 extending from the commutator segments is not stiffened or embrittled by this penetration of the molten metal, as the insulation 23 about the conductor portion 22 within the slot 20 prevents the penetration of the molten metal into the conductor beyond the end of the commutator segment 17. Thus, a good electrical connection is provided between the rotatable member winding 15 and the commutator thereof, without embrittlement of the conductors where they enter the commutator and without the use of any special supporting elements, and the solder about the insulated portion 22 of the conductor provides a good mechanical support for the lead.

In Fig. 5 I have shown a modification of the rotatable member winding connection to the commutator, wherein a commutator segment 31 is provided with a riser 32 in which a recess or slot 33 is formed. A winding conductor lead 34 is arranged in the recess 33 with an insulated portion 35 thereof extending from outside the commutator to the inner end 36 of the recess, and an end portion 37 of the conductor, from which the insulation has been removed, extends beyond the inner side of the riser 32. The conductor 34 is secured to the segment 31 by staking or punching the riser 32 adjacent the slot 33 so that the sides of the riser 32 are pressed inwardly at 38 to retain the conductor 34 in position within the slot 33. When all of the conductor leads from the rotatable member winding have been secured in position in recesses 33 in the commutator segments 31, the end of the commutator adjacent the risers 32 is submerged in molten metal, which may comprise any suitable soldering material, so that the recesses 33 and the stake punches 29 are filled with the soldering material, and a ring 39 of solidified molten metal is formed around the projecting uninsulated end 37 of the conductor 34. This arrangement provides a secure electrical connection between the stranded conductor 34 and the commutator segment element 31, which insures good electrical contact between the different conductive elements, as the solder penetrates into the conductor through the uninsulated conductor portion 27. As in the arrangement shown in Figs. 2 to 4 inclusive, the conductor 34 is not stiffened or embrittled by this penetration of the molten metal, as the insulation about the conductor portion 35 within the recess 33 prevents the penetration of the molten metal into the conductor beyond the end of the commutator segment.

Fig. 6 illustrates another embodiment of my improved connection between a conductor and another electrically conductive element, wherein an insulated conductor lead 40 of an armature winding extends into a slot or recess 41 formed in a riser 42 of a commutator segment 43. In order to insure a good electrical contact between the conductor 40 and the commutator segment element 43, I provide a circumferentially extending V-shaped groove 44 extending into the riser 42 from the inner edge 45 thereof. The conductor 40 is arranged in the recess 41 with an insulated portion 46 extending from outside the commutator to where the recess 41 intersects the upper side 47 of the groove 44, and an uninsulated portion 48 of the conductor 40 extends inwardly from the end of the insulated portion 46 to adjacent the inner edge 45 of the riser 42. In order to secure the conductor in the recess 41, I stake or punch the riser 42 adjacent the slot 41 so as to press together the sides of the recess 41 at 49 above the insulated part 46 of the conductor. When all the conductors from the rotatable member winding have been secured in position in recesses 41 in commutator segments 43, the riser portion 42 of the commutator is submerged in molten metal, which may comprise any suitable soldering material, so that the recesses 41, the grooves 44, and the staking punches 49 are filled with the soldering material. This molten solder then is solidified and provides a secure electrical connection between the different conductive elements and, as explained with respect to the preceding arrangements, insures against stiffening or embrittlement of the conductor 40 by penetration of the molten metal into the conductor beyond the commutator.

In Fig. 7 I have shown a further embodiment of my improved connection between two conductive elements, wherein a winding of a rotatable member of a dynamo-electric machine provided with conductors 51 is electrically connected to commutator segments 52. In this arrangement, each commutator segment is provided with a single longitudinally extending slot or recess 53 which may be cut directly into the commutator segment by an undercutting saw. Generally two winding leads are connected to each commutator segment, and in this arrangement two such leads 51 are arranged one above the other within the slot 53. In order to provide a good electrical contact between the conductors 51 and the commutator segment 52, the insulation is removed from the inner end portions 54 thereof, and these inner ends and adjacent portions 55 of insulated conductor are arranged within the slot 53. These conductors are secured in position within the slot by staking or punching the segment 56 adjacent the recess 53 so as to press the sides of the recess inwardly at 57 above the insulated portions 55. When all the conductor leads from the rotatable member winding have been secured in the recesses 53 of the commutator segments 52, the end of the commutator in which the recesses 53 are formed is submerged in molten metal, which may comprise any suitable soldering material, so that the recesses 53 and the staking punches 56 are filled with this soldering material. This soldering material penetrates into the uninsulated conductor ends 54 and provides a good electrical contact between the conductors and the commutator segments 52. Furthermore, since this solder is adapted to adhere to the sides of the recesses 53 and surround the insulated portions 55, as well as the uninsulated portions 54 of the conductors 51, the ends of these conductors are securely connected to the commutator segment 52. As explained with respect to the other figures of the drawing, with this arrangement of an insulated portion 55 of the conductor extending into the soldered recess, the conductor is not embrittled or stiffened adjacent its connection to the commutator on the outside thereof, as the insulation about these portions of the conductor prevents the penetration of the soldering material into the conductor outside of the commutator.

While I have described and illustrated particular embodiments of my invention, modifications will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. An electrical connection of an insulated conductor to an electrically conductive element having a recess therein including an uninsulated part of said conductor arranged in said conductive element recess and insulation about a part of said conductor extending from outside said recess into said recess to said uninsulated conductor part, and a solidified molten metal arranged about said conductor in said recess without substantial penetration of said molten metal into said conductor beyond the conductive element recess.

2. A current collecting device for a dynamo-electric machine rotatable member which device has segments each formed with a recess therein, an insulated conductor extending from the rotatable member into said segment recess and having an uninsulated part thereof arranged in said segment recess, and means including a molten metal solidified in said recess about said conductor for securing said conductor therein without substantial penetration of said molten metal into said conductor beyond said recess.

3. A current collecting device for a dynamo-electric machine rotatable member which device has segments each formed with a recess therein, a circumferentially extending groove formed in said segments, an insulated conductor extending from the rotatable member into said recess, an uninsulated part of said conductor extending from said insulated conductor into said recess and said groove, and means including a molten metal solidified in said segment recess about said conductor for securing said conductor to said commutator segment without substantial penetration of said molten metal into said conductor beyond said recess.

4. A current collecting device for a dynamo-electric machine rotatable member which device has segments each formed with a recess therein, an insulated conductor extending from said rotatable member into said recess and having a part thereof without insulation also arranged in said recess, said commutator segment being staked adjacent said insulated conductor in said recess to secure said conductor therein, and means including a molten metal solidified in said recess about said conductor for securing said conductor to said segment without substantial penetration of molten metal into said conductor beyond said recess.

5. A current collecting device for a dynamo-electric machine rotatable member which device has segments each formed with a recess therein, a circumferentially extending groove formed in each of said segments, an insulated conductor extending from the rotatable member into said segment recess, an uninsulated part of said conductor extending from said insulated conductor into said segment groove, said commutator segment being staked adjacent said insulated conductor in said recess to secure said conductor therein, and means including a molten metal solidified in said segment recess and said groove about said conductor for securing said conductor to said segments without substantial penetration of molten metal into said conductor beyond said recess.

6. A dynamo-electric machine rotatable member provided with a winding and a current collecting device, said current collecting device having elements each formed with a recess therein and a circumferentially extending groove extending through said elements, an insulated conductor extending from said rotatable member winding into said element recess, an uninsulated part of said conductor extending from said insulated conductor part into said element recess and groove, and means including a molten metal solidified in said element recess about said conductor for securing said conductor to said current collecting device element without substantial penetration of said molten metal into said conductor beyond said recess.

7. A dynamo-electric machine rotatable member provided with a winding and a commutator, said commutator having segments each formed with a recess therein, an insulated conductor extending from said winding into said commutator and having a part thereof without insulation arranged in said segment recess, and means including a molten metal solidified in said segment recess about said conductor for securing said conductor in said recess without substantial penetration of said molten metal into said conductor beyond said recess.

8. A dynamo-electric machine having a stationary member and a rotatable member provided with a winding and a commutator, said commutator having segments each formed with a recess therein, an insulated conductor extending from said winding into said commutator and having a part thereof without insulation arranged in said segment recess, and means including molten metal solidified in said segment recess about said conductor for securing said conductor in said recess and providing an electrical connection therebetween without substantial penetration of said molten metal into said conductor beyond said recess.

9. A dynamo-electric machine having a stationary member and a rotatable member provided with a winding and a commutator, said commutator having segments each formed with a recess therein, an insulated conductor extending from said winding to said commutator and having a part thereof without insulation arranged in said segment recess, said conductor having an insulated part in said segment recess extending from said part without insulation to the outside thereof, said commutator segment being staked adjacent said recess to secure said insulated part therein, and means including a molten metal solidified in said segment recess about said conductor for securing said conductor in said recess.

10. A dynamo-electric machine having a stationary member and a rotatable member provided with a winding and a commutator, said commutator having segments each formed with a recess therein, an insulated conductor extending from said winding to said commutator and having a part thereof without insulation arranged in said segment recess, said conductor having an insulated part extending into said segment recess from outside thereof to said conductor part without insulation, and means including a molten metal solidified in said segment recess about said conductor for securing said conductor in said recess and providing an electrical connection therebetween.

11. The method of connecting an insulated conductor to an electrically conductive element which comprises forming a recess in the conductive element, removing insulation from around a part of the conductor, securing said conductor in position in the recess between the sides of the recess, and securing the conductor in the conductive element recess by solidifying molten metal about the conductor in the recess without substantial penetration of the molten metal into the conductor beyond the conductive element recess providing an electrical connection between the conductor and the conductive element.

12. The method of making a connection between a commutator and an insulated conductor which comprises forming a recess in a commutator segment, removing insulation from around a part of the conductor, placing said conductor part and an adjacent insulated part of the conductor in the commutator segment recess, staking the commutator segment adjacent the recess therein to secure the insulated part of the conductor in position therein, and securing the conductor in the commutator segment recess by solidifying molten metal about the conductor in the recess providing an electrical connection between the conductor and the commutator segment.

LAWRENCE F. HEMPHILL.